Nov. 1, 1960     K. THOMPSON     2,958,364
THERMOPLASTIC COATING AND METHOD FOR PRODUCING SAME
Filed Sept. 12, 1957
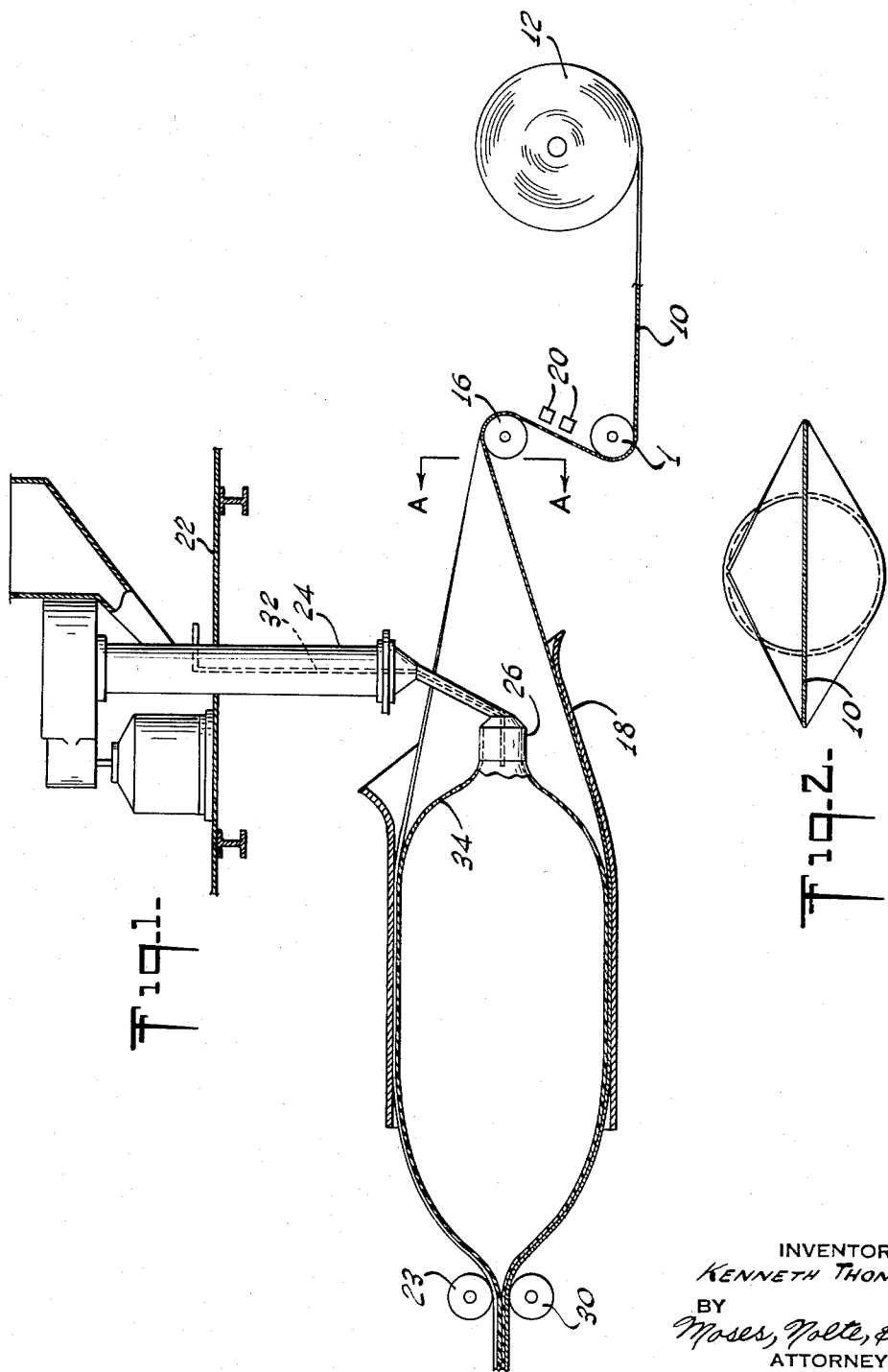
INVENTOR
KENNETH THOMPSON
BY
Moses, Nolte, & Nolte
ATTORNEYS 2,958,364
Patented Nov. 1, 1960

2,958,364

THERMOPLASTIC COATING AND METHOD FOR PRODUCING SAME

Kenneth Thompson, Westwood, N.J., assignor to Lowe Paper Company, Ridgefield, N.J., a corporation of New Jersey Filed Sept. 12, 1957, Ser. No. 683,630

5 Claims. (Cl. 154—1.8)

This invention relates to thermoplastic extrusion lamination coating.

It is an object of this invention to provide a continuous tubing coater wherein by means of air pressure molten thermoplastic film is bonded to the interior of a tube.

It is a further object of this invention to eliminate thermoplastic edge bead waste common in present extrusion lamination procedures.

It is yet another object of this invention to minimize the need for trimming the web after coating.

It is yet another object of the invention to provide a process capable of coating very wide widths or multiples of standard widths within a relatively compact area.

It is still a further object of this invention to eliminate the necessity for employing a casting roll as the releasing surface for extrusion lamination.

It is still a further object of this invention to eliminate the problem of separating the cast film and therefore provide a higher speed operation.

Other objects and advantages of my invention will hereinafter appear in the following description taken in connection with the accompanying drawings in which:

Figure 1 is a diagrammatic plan view illustrating the invention; and

Figure 2 is a sectional view taken along the line A—A of Figure 1.

Referring now to the drawings, there is shown a web of material 10 wound into a roll 12. The web 10 is led around guide rollers 14 and 16 and into a polished steel tubing chamber 18 of adjustable diameter. Within chamber 18 the web 10 is formed into a tube, the two edges of the web 10 butted as close as practical.

The edges of the web 10 may also be adjusted to lap one over the other if the desired product is to be finished in a coated tube form. The area to be lapped may be coated with an adhesive prior to entry and joined while in the tubing chamber 18 to form a continuous tube of the web material.

A surface of web 10 is acted upon by heaters 20 prior to the entry of web 10 into chamber 18 in order to facilitate the adherence of the plastic to the web.

Supported from a platform 22 is a vertical extruder 24. The extruder head 26 is introduced along the central axis in the chamber 18 through the aperture formed as the edges of flat web 10 are turned upwardly to abut against each other to form the tube.

The extrusion equipment would be of a type designed to process thermoplastics as: polyethylene, nylon, cellulose acetate, saran, vinyl chloride, poly styrene, poly olefins and poly esters into a thermal state suitable for film extrusion.

By the use of extruder 24 and employing the technique similar to that used for the extrusion of clear blown film tubing, a bubble of polyethylene or other extrudable polymers is blown into the tube formed from web 10 within the chamber 18. The air pressure used in this film forming operation also holds the web 10 rigid and expanded against the interior of chamber 18 and provides the force required to bond the molten plastic film to the web 10.

The coated web moves out of the forming chamber 18 between two pressure rollers 28 and 30. These rollers flatten the former circular tube and also seal the bubble of air required for the film blowing and bonding operation. These same rollers 28, 30 constitute the drive or pulling rollers for moving the web 10 through the apparatus.

An air line 32 is provided through the central part of the extruder and leads into the film bubble zone to maintain the proper pressure by automatic control. The web 10 and plastic film 34 continuously leave the system at operating speeds but the air bubble formed by the restriction of the rollers 28, 30 remains in a stationary position relative to the machine and is maintained by the balance between the external air pressure and the tension of the extruded film.

After the web has been coated and flattened to a tube, it may then be either slit open again to form a one-side coated flat web or it may be utilized in the form of a coated tube.

The extruder can be mounted in either a horizontal or vertical position and can operate with a tube formed in either a horizontal or vertical position depending upon the special layout of the operating plant. The extruder 24 and extruder head 26 could be mounted to platform 22 so as to move in and out of position in the tubing chamber 18 for easy maintenance and adjustability so as to be properly located for maximum coating performance.

It is understood that this process and coater is operable on either a flat sheet of paper, light weight board, cloth, pliable metal, plastic or other suitable material.

I have described what I believe to be the best embodiments of my invention, however, I do not wish to be confined to the embodiments shown and described but what I desire to cover by Letters Patent is set forth in the appended claims.

What is claimed is:

1. A tubing coater adapted to coat a thermoplastic to a surface of a web of paper, fiberboard and the like comprising, means for forming a web of such material into a tube, means for feeding said web into operative asociation with said tube forming means, a tubular film extruder including a discharge portion extending into the opening formed by the web at a location preceding the point at which the side edges of the web are brought together into a tube, said discharge end extending into the tube as it is being formed, means for discharging a plastic film bubble under pressure through said discharge and for bonding said plastic to the interior surface of the tube as the web is fed through said tube forming means.

2. A tubing coater according to claim 1 wherein said tube forming means is a cylindrical tubing chamber.

3. A tubing coater as in claim 2, wherein said means for forming said plastic into a film bubble and binding said plastic film to the interior surface of the tube includes an extruder head which is located within the tubing chamber in the path of said web and an air line to maintain proper pressure upon the thermo plastic film bubble formed by said extruder within said tubing chamber.

4. A method for thermoplastic extrusion lamination of a surface of a web of fibrous material such as paper, cardboard, fiberboard or the like including heating the surface of the web to be processed, leading the web of material into a forming chamber and forming it into a hollow tube, the edges of the web of material butting as close as possible, introducing into the interior of said hollow tube through the opening of the web formed before the sides are joined a bubble of molten thermoplastic polymeric film under pressure and binding it to said web and drawing the bonded thermo plastic web from the tubing chamber and squeezing it into a flat tube.

5. A method of coating a web of paper, fiber or the like with plastic, comprising the steps of forming the web into a tube with the edges thereof in close proximity, and forming a tube of plastic by internal air pressure within the tube being coated by introducing the plastic through the open end of the web before the edges are joined and bonding the tube of plastic to the tube being coated by said internal air pressure.

References Cited in the file of this patent

UNITED STATES PATENTS

| | | |
|---|---|---|
| 2,664,373 | Reilly | Dec. 29, 1953 |
| 2,753,596 | Bailey | July 10, 1956 |
| 2,767,431 | DeLaubarede | Oct. 23, 1956 |